Patented Jan. 3, 1933

1,892,784

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

PLASTIC OR COATING COMPOSITION

No Drawing. Original application filed May 29, 1928, Serial No. 281,593. Divided and this application filed April 6, 1929. Serial No. 353,268.

This invention relates to compositions for use in plastics or for preparing coats or films. More particularly the invention relates to plasticizers, softeners and the like for such products.

In the past it has been necessary to add plasticizers to various plastic compositions and coating compositions, notably those containing ethers or esters of cellulose, artificial resins of the thermoplastic type, for example phenol-aldehyde resins and phenol-ketone resins, such as "bakelite," phenol-furfural resins, aldehyde-urea resins, polybasic acid-polyhydric alcohol resins of the glycerol phthalate type and other compositions such as polymerization products of cumarone and indene, styrol, itaconic acid, and the like, together with sulfur resins, resins prepared from aromatic amines, casein plastics and the like. Many of these products have been unsatisfactory because in the case of some plastic compositions the resultant product is brittle or lacks flexibility or machining qualities and in the case of coating compositions which are dissolved in solvents the complete evaporation of the solvents leaves films which are brittle and tend to crack or peel. A class of compounds called softeners have been used to obviate this, among the most important softeners being high boiling esters, such as those of phthalic acid, certain high boiling organic compounds, such as various aromatic sulphonamides, and the like. Some of these products are very satisfactory but many have not achieved great commercial success because of excessive costs. Plastic and coating compositions using natural resins, such as shellac and the like have also been plasticized.

The present invention relates to plastic compositions and compositions for forming coatings in which a new class of compounds are used as softeners, namely, the substituted phthalids. The substituted phthalids include the hydrogenated phthalids such as the tetra- and particularly the hexahydrophthalid, and the phthalids in which the oxymethyl group is substituted by one or more alkyl, aryl, aralkyl or alkylidene radicals. These radicals in which the oxymethyl group contains a substituent may also be hydrogenated.

The compounds with the exception of a few of the alkylidene compounds are substantially inert, soluble in most of the solvents used and can be readily incorporated with plastic compositions or coating compositions. They do not evaporate at the temperatures necessary for molding and endow the final product with the desired plasticity and workability. The particular substance to be used will depend to a certain extent on the nature of the plastic or coating compositions desired. Thus, where very fluid compositions are desired the hydrogenated phthalids are particularly suitable. For example, hexahydrophthalid is a colorless, odorless, heavy oil having a boiling point of 134–138° C. at 25 mm. pressure and can be used in many plastic compositions and particularly coating compositions, such as for example, cellulose ester or ether lacquers, glycerol phthalate lacquers, and the like.

Hydrogenated phthalids may be produced by catalytic vapor phase hydrogenation of phthalic anhydride in the presence of suitable catalysts or liquid phase hydrogenation of phthalic anhydride at ordinary or superatmospheric pressure, and it is sometimes desirable to produce mixtures of phthalids and their hydrogenated products or mixtures of the various hydrogenated products in order to produce plasticizers having intermediate characteristics between those or phthalid and hexahydrophthalid. Such mixtures either produced directly by catalysis or prepared by blending the pure ingredients are included in the present invention under the expression "phthalid substance". The phthalids which are internal esters of orthooxymethylbenzoic acid or its derivatives vary in their physical properties depending on the degree of hydrogenation but they all possess the desirable softening properties, are non-corrosive, relatively non-volatile and satisfactorily withstand the temperatures required in molding plastics.

Where less fluid condensation products are desired the substituted phthalids in which the oxymethyl group is substituted are desirable. They have the following general formulæ:

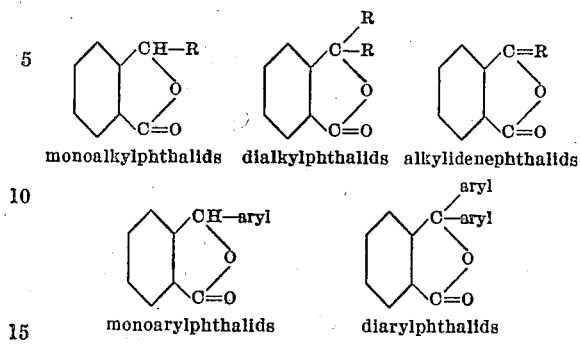

monoalkylphthalids   dialkylphthalids   alkylidenephthalids monoarylphthalids    diarylphthalids The substituted di- tetra- and hexahydrophthalids are also usuable, and constitute effective plasticizers. A few substituted phthalids are the monoethyl- propyl- butyl- and isobutylphthalids, and hydrogenated phthalids possessing in general these products are low melting solids or oils with a pleasant celery odor. Alkylidenephthalids, such as ethylidene and propylidenephthalids, and the like, are of importance in certain phenol resins, and it seems probable that a certain amount of resinifying reaction takes place between the alkylidene double bond and the phenol, since this double bond is of course of aldehydic character. It is obviously impossible to definitely determine just what takes place in a plastic composition which forms an infusible, insoluble end product. Examples of dialkylphthalids and hydrogenated phthalids are the diethyl, dipropyl, dibutyl and diisobutylphthalids and hydrogenated phthalids. Arylphthalids such as phenylphthalids or diphenylphthalids are also very important, especially where extremely high boiling, normally solid plasticizers are desired, as in the case of some molding compositions.

The whole group of phthalid substances is characterized by softness and plasticity, relatively low vapor pressure and desirable resistance to high temperatures. Many of the products are colorless solids or oils, either odorless or possessing an agreeable odor, such as the monoalkylphthalids; some are colored, being yellow, yellow brown or red brown oils or solids. All of the members are non-corrosive and do not evolve poisonous vapors, and possess very advantageous properties for use as plasticizers.

It should be understood that the effect of the phthalids as plasticizers is primarily physical. There is every reason to believe from their behavior that usually no chemical compounds are formed between the phthalids and the plastic compositions in which they are used although of course this cannot be determined with complete accuracy in every case as the final products obtained for molding compositions are not of a character which permit of ready chemical analysis.

The following examples will illustrate the application of the invention to a few of the immense number of plastic compositions and coating compositions which are of importance in industry today. It is understood that the invention is not limited to the details set forth in these specific examples which are merely illustrations of a few typical embodiments.

*Example 1*

85 parts of glycerol phthalate resin, preferably freshly prepared and fairly hard but not infusible, are mixed with 15 parts of a substituted phthalid and heated to 150° C. accompanied by stirring until a homogeneous mixture is obtained. If desired, fillers may be incorporated and the product can be molded preferably under pressure, preferably at 150–250° C., to form an infusible product. Heating at a lower temperature, such as 80–150° C., can also be carried out at a lower pressure but a longer time is necessary.

*Example 2*

Phenol and formaldehyde are combined by well known methods to form a condensation product which can be rendered infusible by heating. The condensation is preferably carried out in the absence of fixed alkalis, water is removed, and 10–20% of monoethyl phthalid, or ethylidene phthalid is homogeneously incorporated with the condensation product, heat being used, if necessary, to render the former sufficiently fluid to permit thorough mixture. The plasticized condensation product may be mixed with fillers, if necessary, such as asbestos, wood flour, kieselguhr and the like, and can then be hot molded to set to an infusible product.

*Example 3*

A fluid condensation product of phenol and formaldehyde is prepared and about 20–25% of hexahydrophthalid is homogeneously incorporated. This product can be used as an enamel or coating, if necessary with the addition of colors, and spreads well while hot on a clean metal surface. It should then be baked for a short time to harden the resin, pressure being applied if necessary. The enamel produced is superior to those prepared from unplasticized phenol and formaldehyde condensation products, and is much more flexible. Its spreading and covering powers are also improved.

*Example 4*

A fusible phenol furfural condensation product is prepared in the usual manner and after removing water and any free alkali which may be present about 12% of a mixture of about 90% phthalid and 10% hydrogenated phthalids is incorporated, the condensation product being sufficiently heated to permit thorough incorporation. Fillers may be added, if desired, and the composition then hardened in the usual manner.

Example 5

A formaldehyde-urea resin is prepared in the usual manner and while still in the fusible state 3–10% of hexahydrophthalid or a mixture of hydrogenated phthalids which may contain some unhydrogenated phthalid is added, sufficient heat and agitation being used to permit thorough incorporation. The resin is then hardened in the usual manner.

Example 6

A fusible resin prepared by polymerization or condensation of styrol is homogeneously admixed with about 5–8% substituted phthalid and is then hardened in the usual manner.

Example 7

A resin prepared by condensation or polymerization of itaconic acid is admixed with 5–9% of hexahydrophthalid, sufficient heat being used to permit thorough incorporation, and the resin is then hardened in the usual manner.

Example 8

A nitro cellulose plastic is prepared with from 10–30% of monophenyl phthalid, sufficient heat and agitation being used to permit thorough incorporation. The composition can be readily molded and articles made from it may be polished to give a lustrous surface.

Example 9

A cellulose nitrate lacquer is prepared with low boiling solvents to which about 10–15% of hexahydrophthalid has been added. The lacquer spreads and brushes easily forming a very flexible, tough film.

Example 10

A cellulose acetate lacquer is prepared in the usual low boiling solvents and about 15% of hexahydrophthalid or a mixture of tetra- and hexahydrophthalid or their monoethyl derivatives is homogeneously incorporated. The lacquer can be used as a brush lacquer and when suitable solvents have been used a very smooth, flexible film is obtained.

Example 11

A shellac molding composition is prepared and a phthalid substance is added to the amount of about 25% by weight of the shellac. Thorough incorporation is effected by means of heat together with stirring or kneading. The composition then can be readily molded giving a fine surface and being readily workable.

The foregoing examples give a few representative illustrations showing the use of phthalid substances in plastics and lacquers. The precise formulæ, for example of the cellulose ester lacquers, has not been given as the present invention is not primarily concerned with particular formulæ. It has been found that the phthalids and particularly the hydrogenated phthalids are very effective, high boiling plasticizers for a wide range of lacquers, especially brush lacquers. The invention is not limited to the use of particular formulæ. Instead of cellulose ester plastics, of course the invention may also be applied to cellulose ether lacquers or plastics.

This application is a division of my prior application, Serial No. 281,593, filed May 29, 1928.

What is claimed as new is:

1. A plasticized composition comprising a cellulose plastic and at least one hydrogenated phthalid.

2. A plasticized composition comprising a cellulose plastic and a mixture of hydrogenated phthalids.

3. A plasticized composition comprising a cellulose ester plastic and a hydrogenated phthalid substance having the formula

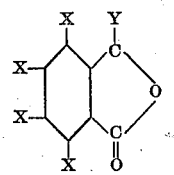

in which at least one X equals $H_2$ and the remaining X's are H or $H_2$ and Y is $H_2$, H-alkyl, dialkyl, H-aryl, diaryl or alkylidine.

4. A plasticized composition comprising a celulose nitrate plastic and a hydrogenated phthalid substance having the formula

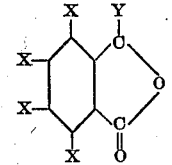

in which at least one X equals $H_2$ and the remaining X's are H or $H_2$ and Y is $H_2$, H-alkyl, dialkyl, H-aryl, diaryl or alkylidine.

5. A coating composition comprising an organic film forming material, at least one voltile solvent therefor and at least one hydrogenated phthalid substance having the formula

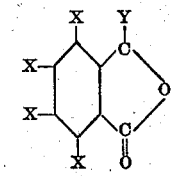

in which at least one X equals $H_2$ and the remaining X's are H or $H_2$ and Y is $H_2$, H-alkyl, dialkyl, H-aryl, diaryl or alkylidine.

6. A coating composition comprising a cellulose derivative capable of forming films, at least one volatile solvent therefor and at least one hydrogenated phthalid substance having the formula

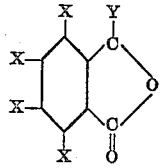

in which at least one X equals $H_2$ and the remaining X's are H or $H_2$ and Y is $H_2$, H-alkyl- dialkyl, H-aryl, diaryl or alkylidine.

7. A coating composition comprising a cellulose ester capable of forming films, at least one volatile solvent therefor and at least one hydrogenated phthalid substance having the formula

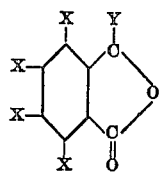

in which at least one X equals $H_2$ and the remaining X's are H or $H_2$ and Y is $H_2$, H-alkyl, dialkyl, H-aryl, diaryl or alkylidine.

8. A coating composition comprising a cellulose nitrate capable of forming films, at least one volatile solvent therefor and at least one hydrogenated phthalid substance having the formula

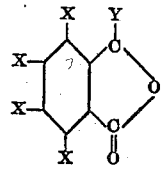

in which at least one X equals $H_2$ and the remaining X's are H or $H_2$ and Y is $H_2$, H-alkyl, dialkyl, H-aryl, diaryl or alkylidine.

Signed at Pittsburgh, Pennsylvania, this 3rd day of April, 1929.

ALPHONS O. JAEGER.